United States Patent [19]

Herbert et al.

[11] Patent Number: 4,546,435
[45] Date of Patent: Oct. 8, 1985

[54] GRAPHIC COMPUTER SYSTEM AND KEYBOARD

[76] Inventors: Frank P. Herbert, 2145 Ivy St.; Maxwell K. Barnard, P.O. Box 693, both of Port Townsend, Wash. 98368

[21] Appl. No.: 622,385

[22] Filed: Jun. 20, 1984

Related U.S. Application Data

[63] Continuation of Ser. No. 147,080, Jun. 24, 1980.

[51] Int. Cl.⁴ ............................................... G06F 9/00
[52] U.S. Cl. .................................................... 364/300
[58] Field of Search ........................... 364/200, 900; 340/365 VL, 712

[56] References Cited

U.S. PATENT DOCUMENTS

| | | | |
|---|---|---|---|
| 3,187,321 | 5/1961 | Kameny | 340/712 X |
| 3,200,325 | 9/1961 | Lutz | 340/365 UL X |
| 3,879,722 | 4/1975 | Knowlton | 340/712 X |
| 4,085,443 | 4/1978 | DuBois et al. | 364/900 |
| 4,202,041 | 5/1980 | Kaplow et al. | 364/900 |

OTHER PUBLICATIONS

Standard Dictionary Of Computers And Information Processing, Martin H. Weik 1969, Hayden Book Co.
F. Herbert And M. Bernard, "Without Me You're Nothing", Publ. Simon And Schuster, 1980.

*Primary Examiner*—Raulfe B. Zache
*Assistant Examiner*—John G. Mills
*Attorney, Agent, or Firm*—Graybeal & Cullom

[57] ABSTRACT

A novel graphic system and associated computer keyboard for easily and effectively programming a computer is disclosed. Specifically, a linear and structured flow chart using easy to understand graphic symbols allows transfer of the program represented by the flow chart directly into a computer via a keyboard which has associated graphic symbols designated on each of the individual keys.

3 Claims, 15 Drawing Figures

GRAPHIC COMPUTER SYSTEM AND KEYBOARD

This application is a continuation of application Ser. No. 147,080, filed June 24, 1980.

BACKGROUND OF THE INVENTION

The present invention relates to computers and more particularly to a computer which utilizes a graphic keyboard and operating system which allows for processing, programming and editing without the need for a complete knowledge of complex computer language.

In the past a variety of methods have been used for the programming of computers. The most common is to initially design a program with the aid of a visual device known as a flow chart. As is understood by one skilled in the art, these flow charts follow the internal paths of the computer program and are quite complex. These flow charts utilize symbols which have become standardized and have been adopted by the American National Standards Institute, Inc. in 1970 and approved by the Federal Office of Management and Budget in 1973. The problems associated with the design of these conventional flow charts, however, are that they are quite complex and require a complete knowledge of computer language in order to transfer the information or design of the program represented by the flow chart to the actual computer.

The present invention has overcome the above problems by providing a system which allows for the addressing and manipulating of machine-language levels of sophisticated computers from a keyboard whose graphic symbols and simple descriptions can be widely and easily understood. The graphic flow-chart system and its associated keyboard of the present invention embodies a new higher level language which can be used directly with existing equipment, or with a computer designed expressly for this new system, and/or as a teaching tool. With a specific interface kit, this new flow chart system and its associated keyboard can be matched to any existing hardware and/or software. Explicit program-labelling formats can be fitted tightly to these graphics, and the more complex the original language-operating system, the more unique the present invention's simplifications.

It is thus an object of the present invention to eliminate the need to learn a complex computer language in order to program a computer.

It is a further object of the present invention to provide easy transition from a computer flow chart to the actual programming of the computer.

It is also an object of the present invention to develop a computer system built around the invention, or which may be adapted to existing computers.

These and other objects will more clearly appear when taken in conjunction with the following disclosure and the appended claims.

DESCRIPTION OF THE DRAWINGS

For a fuller understanding of the invention reference is had to the following description taken in connection with the accompanying drawings of the preferred embodiment in which.

The figures and symbols herein were chosen to demonstrate the principle of this invention and are not intended to imply limits of application.

DESCRIPTION OF THE PREFERRED EMBODIMENT

Figure 1:
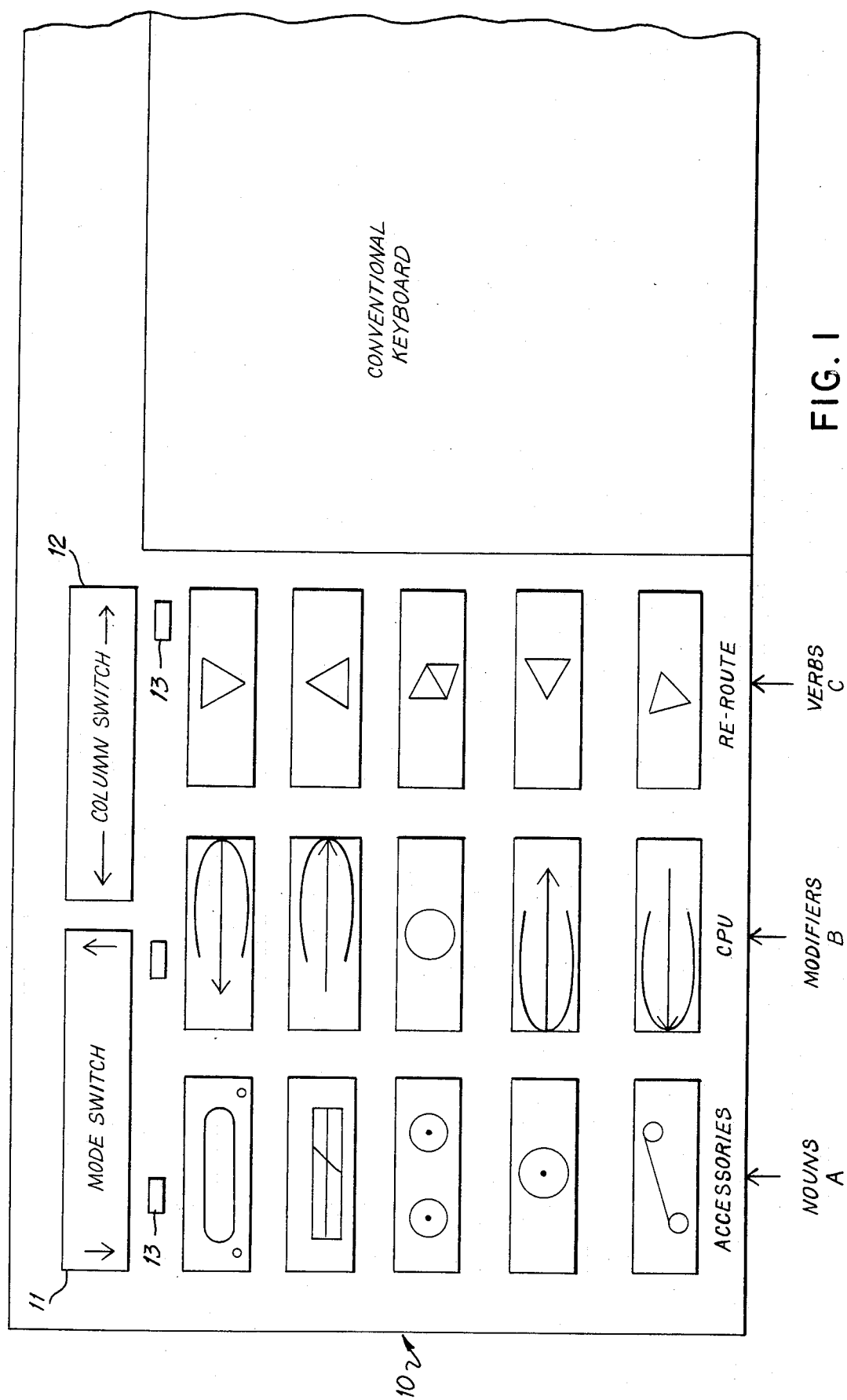
FIG. 1 is a schematic representation of the keyboard of the present invention depicting a first mode of symbols represented by the keys in the vertical columns.

Referring now more particularly to the accompanying drawings, wherein like numerals designate similar parts throughout the various views, attention is directed first to FIG. 1, wherein the keyboard of the present invention is designated generally by reference number 10. As can be seen from the drawing, keyboard 10 is provided with three columns of keys, A, B, and C, each column comprising five vertical keys. Keyboard 10 also is provided with two mode-movement shift mode switch 11 and column switch 12 which are adapted to execute the steps contained in the flow chart prepared using the graphic symbols of the present invention. Column switch 12 is additionally a three-position switch to control the cursor. Generally, keyboard 10 constitutes a programming-editing-processing tool designed to be used in conjunction with a conventional computer keyboard (not shown) which represents the present invention's description column.

Moreover, as will be seen, the order in which the prgram is entered into the computer follows the precise order laid down in the flow chart prepared in accordance with the present invention. In addition, the present invention is applicable to computers which require stepped numbers (e.g., sequential statement numbers) and to those which do not require this numbered order. Note that the information to be entered into the description portion of the program can be written in typewriter fashion using familiar alphanumerics and plain English, or a readily understood shorthand version of English. (Other languages are equally applicable.)

Basically, the keyboard and operating system of the present invention employs three familiar elements of standard computer languages: nouns, verbs and modifiers which in accepted computer equivalents are names, operators and instructions. It has been found helpful in explaining the present invention to think of computer instructions as modifiers, that is, as adjectives and adverbs.

The present system retrieves its data by names—a noun specific to every element stored subject to retrieval. Names are always associated with places (addresses). Names are distinguished from remarks in a familiar fashion, i.e., a remark is a constant while a name is a variable with its place. In operation the present system should be designed to automatically distinguish between program places and storage places.

Figure 2:
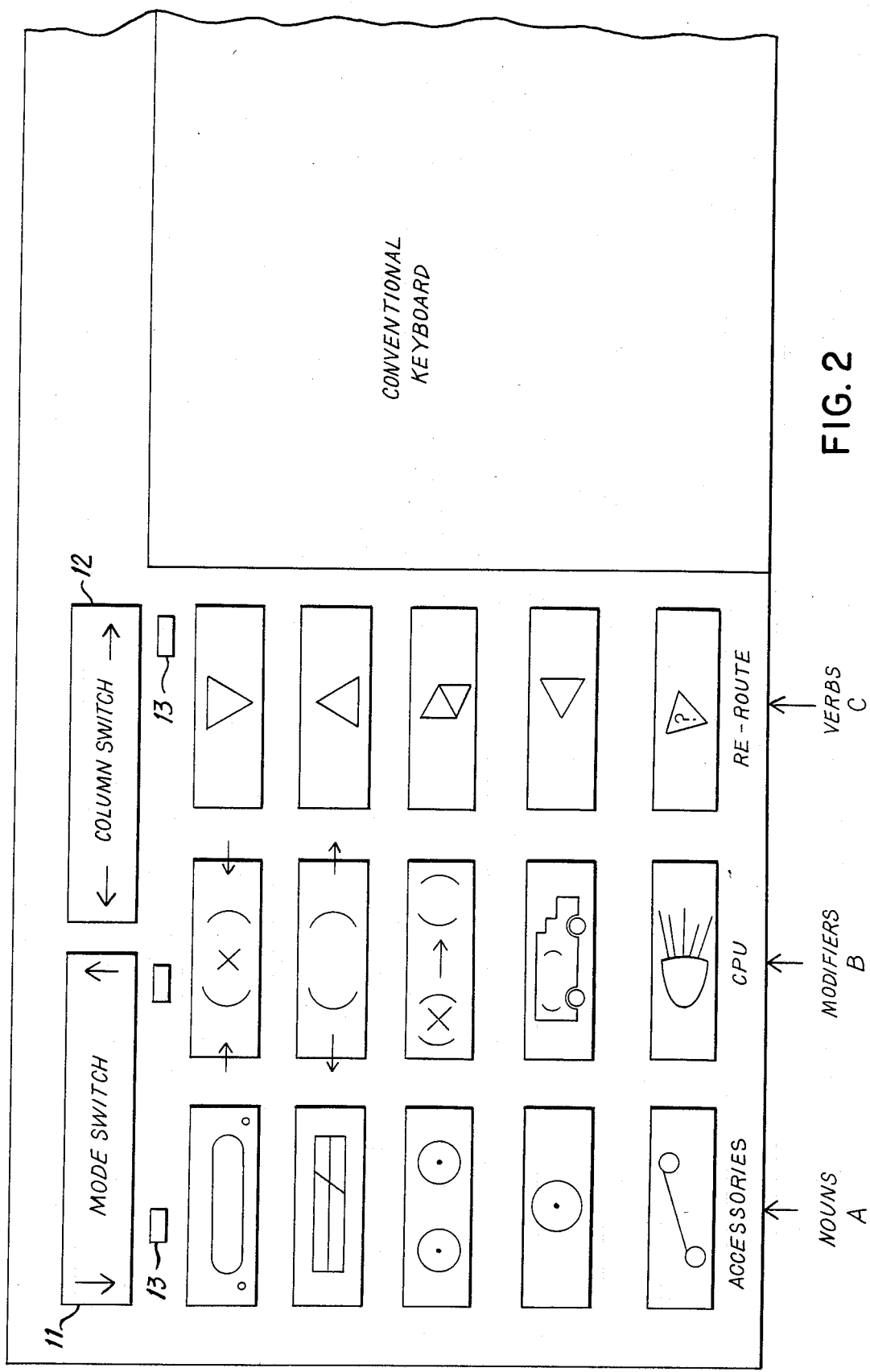
FIG. 2 is a schematic representation of the keyboard of the present invention depicting a second mode of symbols for the second column of keys.

Referring again to FIG. 1, it can be seen that column A comprises five vertical keys each provided with a single graphic symbol which is associated with the function of that key. For example, depression of the uppermost key in column A will give the operator access to the CRT either for input or output depending upon which of the modifier keys in column B is depressed. For an explanation of the symbols depicted on the keys in FIG. 1 and 2, attention is directed to FIG. 3. Note, however, that by changing the position of the four-phased mode switch 11, the graphic symbols depicted on each of the keys may be changed. This means that each key is capable of projecting many different symbols onto the visible upper surface. Although most of this potential is not required in most application, it represents a simple way to expand the system. This is especially important when you look at the first column of keys in FIG. 1 and contemplate the addition of more computer attachments. It means that each of those keys can represent several peripheral attachments, each with its identifying symbol.

Column switch 12 is provided with arrows which indicate the direction of column activation and/or cursor movement and allows the operator to select any column of the graphic keyboard to be used. Column switch 12 also allows the operator to shift to the conventional keyboard for entering informaton in the description bank of the computer.

Located between the rocker mode switch 11 and column switch 12 and the graphic keys, indicator light signals 13 identify which row (or rows) the operator (or the system) has activated. This may be accomplished by the use of standard LEDS, moreover, the keyboard of the present invention may be constructed such that when the operator selects a particular column, all of the key lights are activated, and further, when one of the keys in that column is pressed, the other lights go out.

In a typical application, the operator would select a column of graphic keys by moving column switch 12 to the appropriate position. Mode switch 11 would then select between the possible graphic pictures represented by the keys. As can be seen from FIG. 2, the Central Processing Unit keys (CPU) double as editing keys when mode switch 11 is in the "second" mode, i.e., in a mode which is different from that represented by the symbols shown in FIG. 1. Column C is used either with programming or editing functions, as for example, inserting and running a program (including STOP) which are part of the editing function.

Note that the two mode-shift movement mode switch 11 and column switch 12 are useful in teaching the present graphic system in that they permit an inexperienced operator to correct and improve programs in a straightforward linear fashion which exactly follows the visual form of the graphic flow chart.

The keyboard arrows, including the input-output arrows of the CPU column and the directional triangles on column C of graphic keys, are to be considered as destination indicators and tabulation keys. As would be understood by one skilled in the art, automatic functions for these arrows are incorporated in the softward and firmware of the operating system.

All automatic functions peculiar to the graphic system are optional. The following are a number of automatic functions which may be incorporated in the present invention:

(1) When the operator selects a storage place in a program (having depressed a graphic key indicating such a place), the program is moved automatically to the description column (the conventional input keyboard) where the operator is required to name (identify) the storage place.

(2) Similarly, when a destination-arrow key is depressed, the program is moved to the description column where the operator is required to name the entry point.

(3) In the same fashion, when the entry key on the graphic keyboard is depressed, the program is moved to the description column for the operator to name the entry point.

It is obvious that other aids to programming can be incorporated with appropriate graphic symbols to function automatically. The three examples above demonstrate the way the graphic keyboard and operating system provides such functions.

All automatic movements are indicated by activation of an appropriate signal light—in most instances a conventional LED.

Further examples of automatic functions include:
DELETE
INSERT
MOVE
CORRECT (change)
SEARCH
RESTORE To modify a program or to edit a text, the operator would shift to the editing mode on the graphics keyboard. The operator can then search and/or execute any of the above functions on any of the four keyboard columns. In each instance, the selected graphic sumbol and its name would be shown on the CRT and/or by appropriate light signals.

By merely typing one of these six names at the appropriate point in the description portion of the program, the operator activates that function. The operator also has the option of activating the desired function by depressing the key bearing the appropriate symbol on the graphics keyboard.

While it is obvious that CORRECT (change) could have been eliminated and these functions relegated to DELETE and INSERT, the CORRECT (change) function was chosen to demonstrate a further application of the present invention. CORRECT (change) can be reserved for small-order revisions—single symbols and/or single words. In that case, DELETE and INSERT can be used to edit large blocks of text or programs.

Referring to the above-identified examples:

RESTORE is part of the SEARCH function. It is essentially a STORAGE and RECALL system which can be used in many ways, including debugging programs. It allows the operator to find any previously modified position in a program. The operator can then RESTORE anything which may have been previously changed or eliminated after that point. This allows the programmer to rework a program, changing it according to a new concept. It also gives the programmer freedom to experiment with alternatives while not losing the main line of a program.

CORRECT (change), also incorporated into SEARCH, allows the operator to find a pre-selected place in a program or text where a correction or change is desired.

MOVE, DELETE and INSERT operate in similar ways. MOVE becomes a selective SEARCH and editing command whose function is indicated by a graphic symbol (a moving van). To MOVE blocks of text or of a program, the graphic symbols and their arrows guide specific changes. The operator can tell by the arrows in which direction the movement goes. New positions for what is MOVEd are seen on the CRT, called up by depressing the appropriate graphic keys.

Figure 3A:
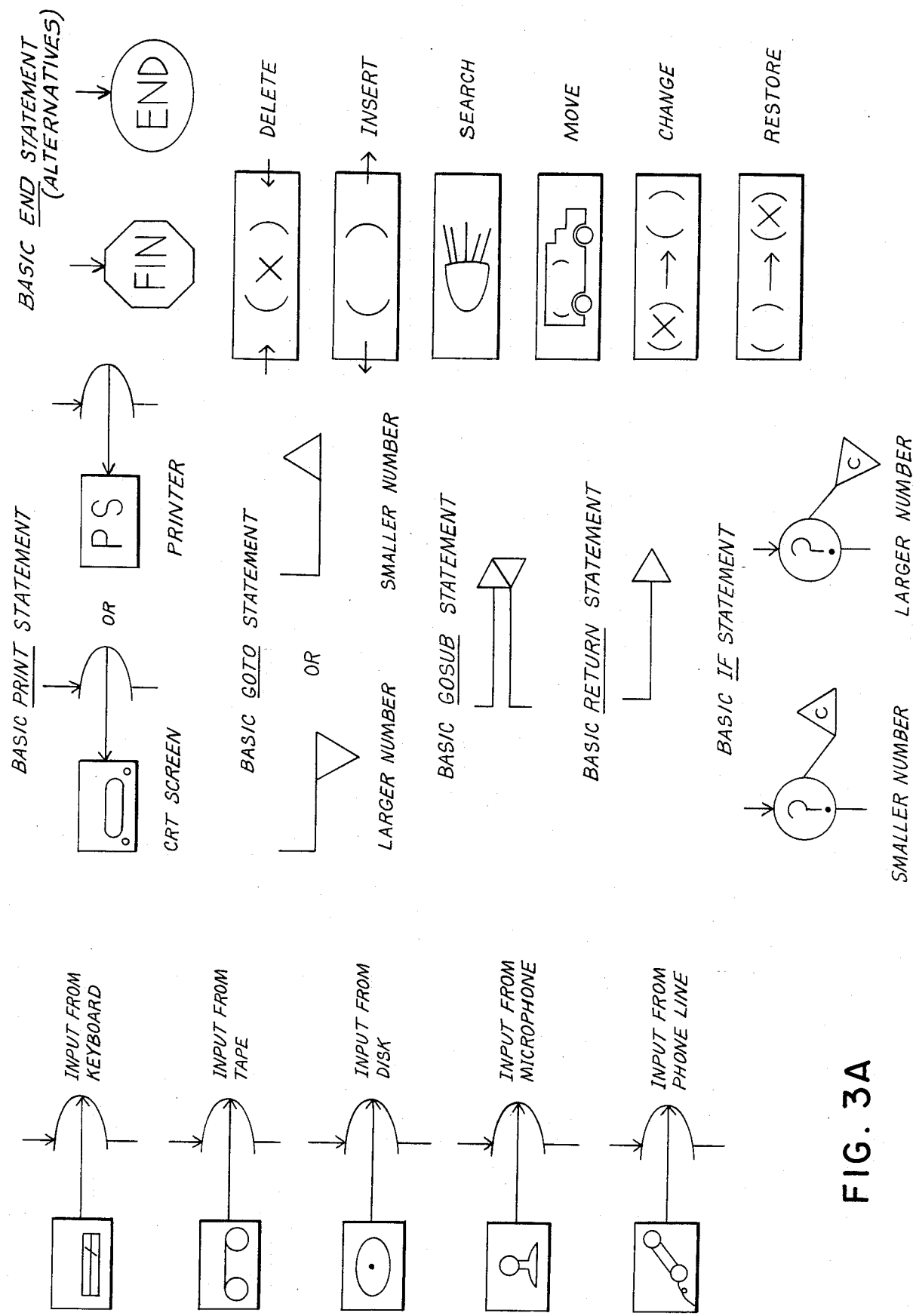
FIGS. 3A and 3B depict a number of graphic symbols used in the present invention and their meaning.
Figure 3B:
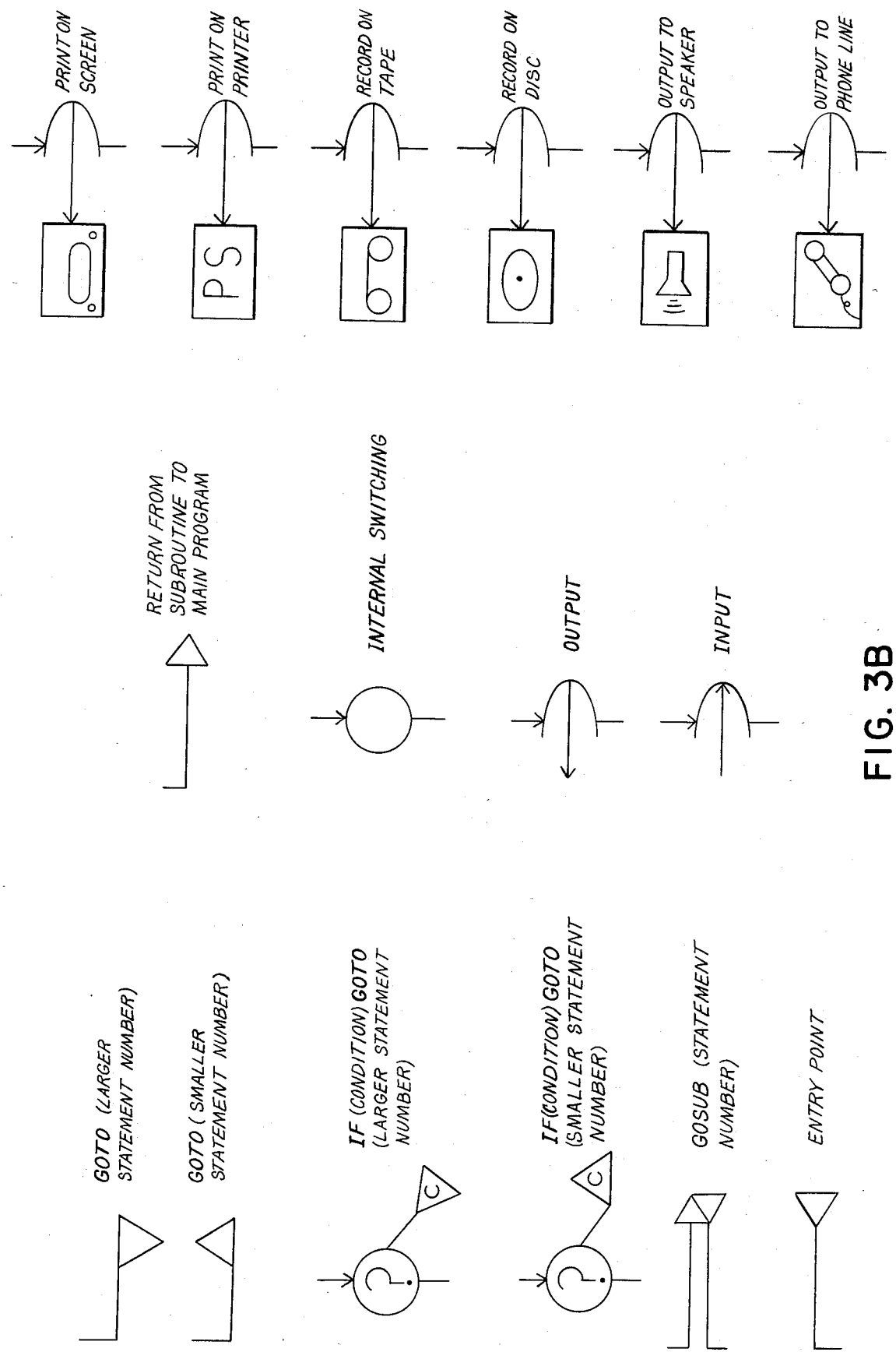

Referring to FIG. 3, a number of graphic symbols are depicted with their meanings. Using these symbols, it is possible to construct a flow chart which begins at the top of a page and continues downward in a structured and linear fashion. It does not split into separated multiple paths as the standard flow charts of the prior art often do. Therefore, once constructed the program represented by the flow chart may easily be transferred to the computer via the graphic symbols. In order to more fully understand the present invention, the following example of a program for a simple car maintenance program is given below utilizing the graphic symbols of the present invention. p As with any program, it is necessary that an objective be set and an outline be drawn. A preliminary outline can be as follows:

(1) Change oil and lube every three months or 3000 miles;
(2) Change oil filter every second oil change;
(3) Rotate tires and check brakes every 6000 miles.

The above outline provides the rules from which the maintenance tires and/or mileage can be figured. The program will use records of when service was last performed and these rules will be used to calculate when the next service must be done. Note that at this point the objective and the outline of the program is verbal. After the outline is completed it is broken down into manageable pieces which will contain every switching operation. Each piece will be given a name which will be carried through to the final program. In addition, statement numbers will be assigned to each step starting at 1000 and counting by thousands for major steps, giving the smaller numbers between to the smaller steps.

In preparing the flow chart of the present invention, it is beneficial to divide the chart into three vertical columns which correspond to the three vertical columns of keys depicted in FIG. 1.

Figure 4:
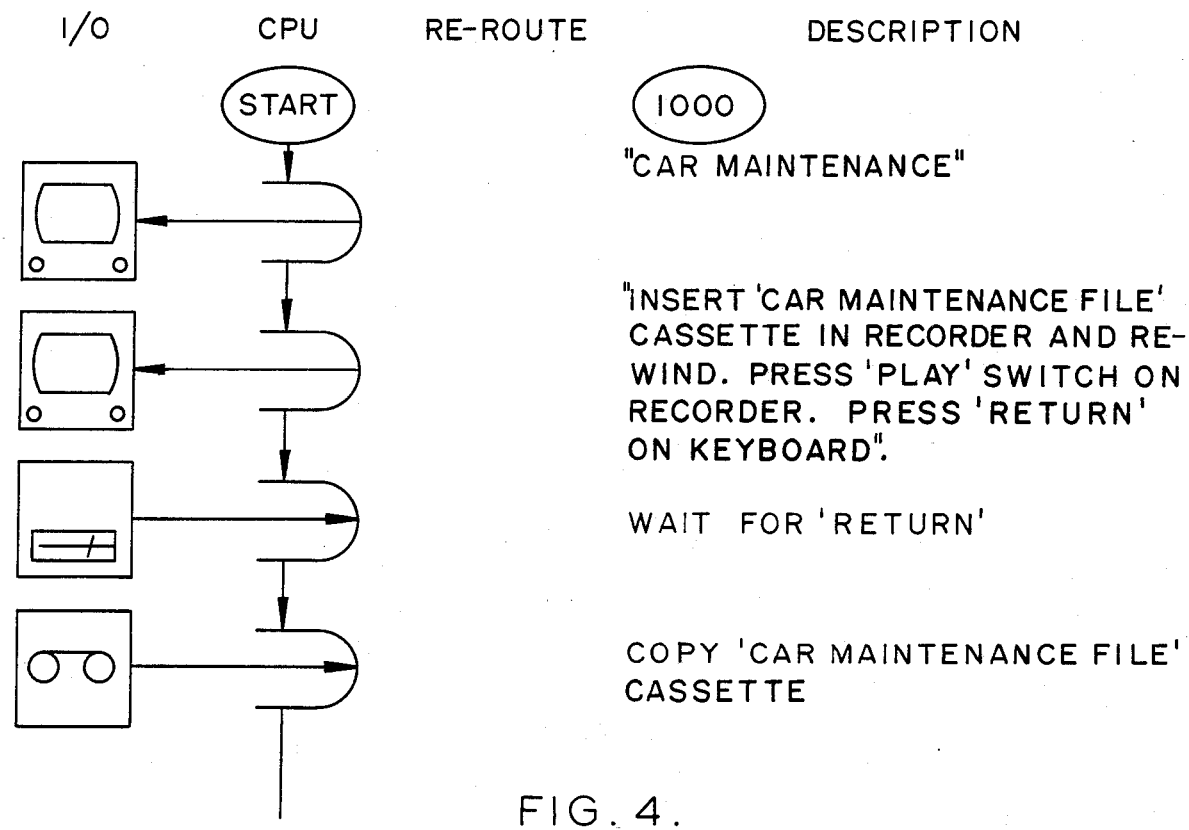
FIGS. 4-14 diagrammatically illustrate the development of a typical program flow chart in accordance with the present invention.

The first thing that should appear on the flow chart is "The Title." The program's beginning is indicated on the chart by an oval box containing the word "START." Since BASIC (a typical computer language) programs always start with the smallest numbered statement and proceed sequentially to the largest, the flow chart starts with the smallest number, as shown in FIG. 4.

The object of the present flow chart is to provide a smooth transition from flow chart to computer. To do this, the description column is vital, even though the overall program strategy is contained in the first three columns. In the description column, things such as main statement numbers, variable names, re-routes and switching operations are identified. The resulting map will translate easily into BASIC or other programming languages.

Note that information is first given to the program uses via the CRT, just one step on the flow chart. Other details include the START symbol and beginning statement number which is circled.

The program user now chooses between: (1) recording completed service or (2) displaying the upcoming maintenance as diagrammed below. The existing maintenance records can be copied from cassette tape storage. Two tapes are needed—one for the program and one for the maintenance records.

The program tape will be copied using the BASIC "LOAD" statement. The record tape will be controlled by the program. (Note that the first time this program is used appropriate information must be provided on the record tape for the program to RUN).

Since both functions use the information stored on the record tape, the records should be copied at this stage. That way the copying operations only have to be in the program once. The program tells the user to put the cassette into the recorder and rewind the tape. The program must be stopped while this is done and a way to restart it from the keyboard must be provided when the cassette is ready. Look at the description column. The INPUT symbol for this step is accompanied by a descriptive "WAIT FOR 'RETURN'."

Figure 5:
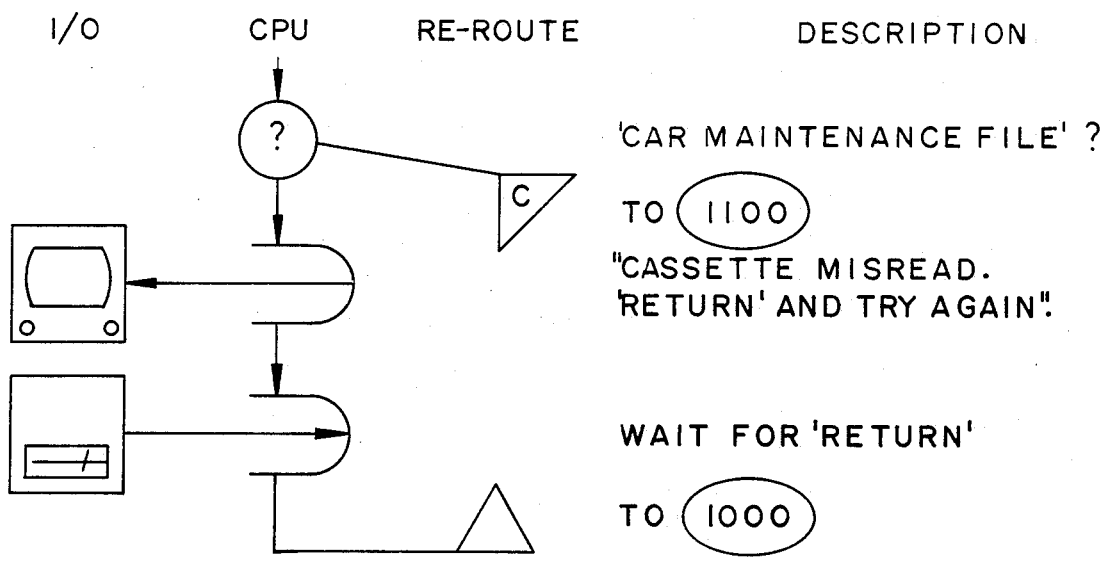

Assuming the wrong tape is accidentally inserted, the program may provide a solution, as shown in FIG. 5.

Figure 6:
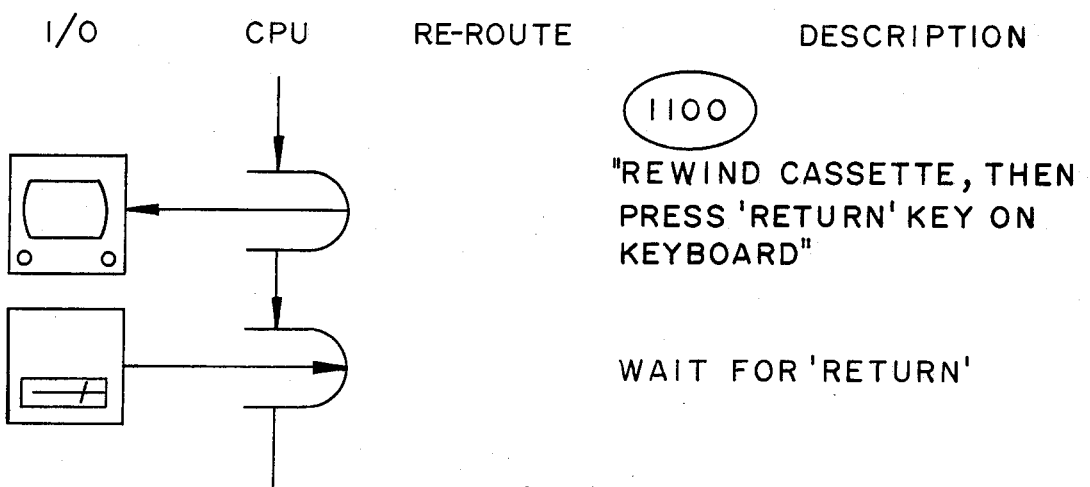

Many times tapes are not fully rewound. In order to overcome this, what is shown in FIG. 6 may be added to the flow chart.

Figure 7:
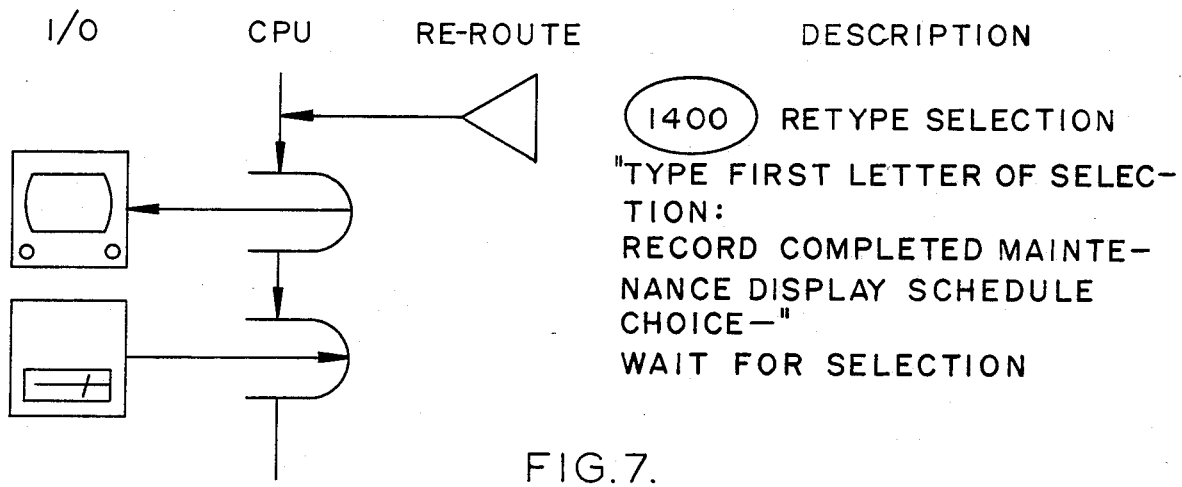

A choice between two functions must then be made. There are many ways to do this. The most common is to list functions and let the program user type the first letter of the choice. This means, of course, that no two functions can start with the same letter. In this program, wherein the two functions are RECORD COMPLETED MAINTENANCE and DISPLAY SCHEDULE, that presents no problem, as shown in FIG. 7.

Figure 8:
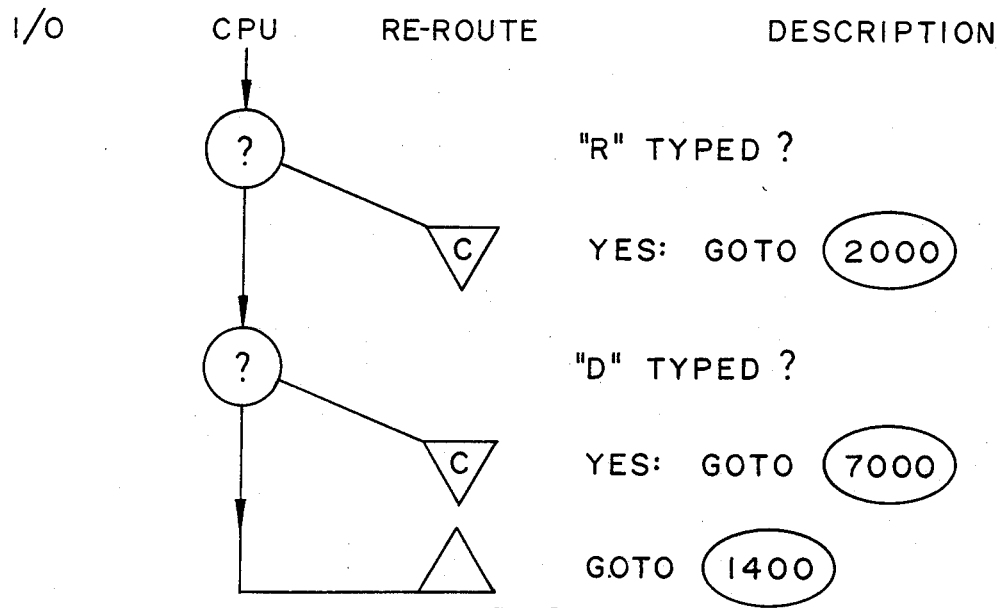

Part one of the outline now contains only the one item: the selection must be checked and the program re-routed to the correct routine. If one of the required letters is not typed, the program should return to the point where a selection is made, as shown in FIG. 8.

Figure 9:
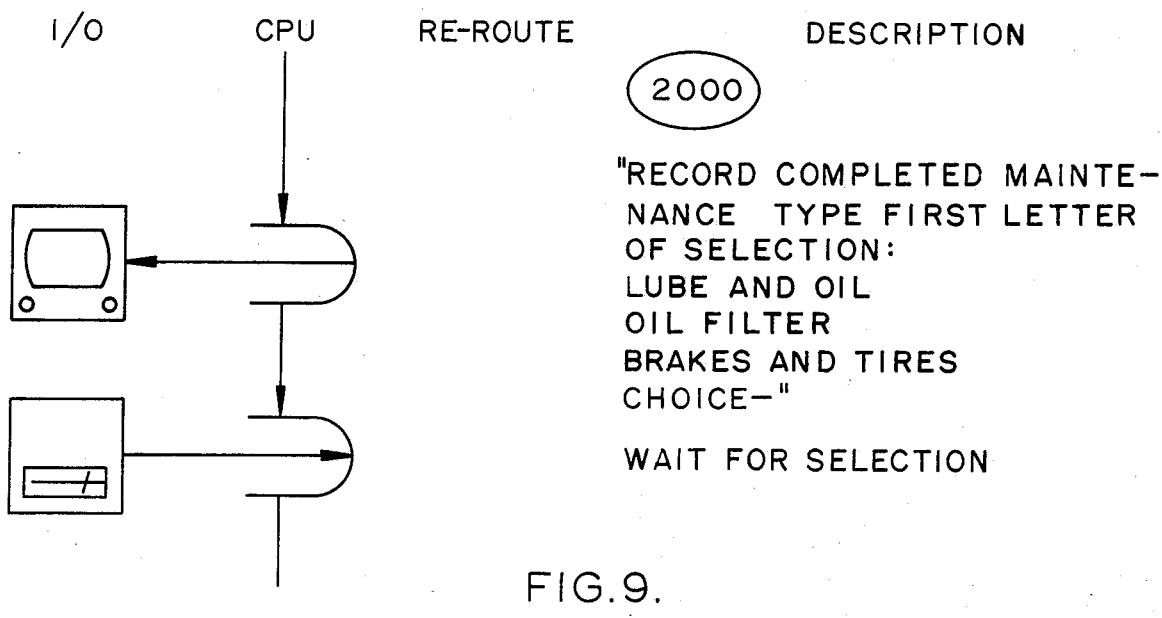

Section two of the outline must provide access to each maintenance record individually and compute the next maintenance. It should start with a title and the list of maintenance functions from which you can choose, as shown in FIG. 9.

Figure 10:
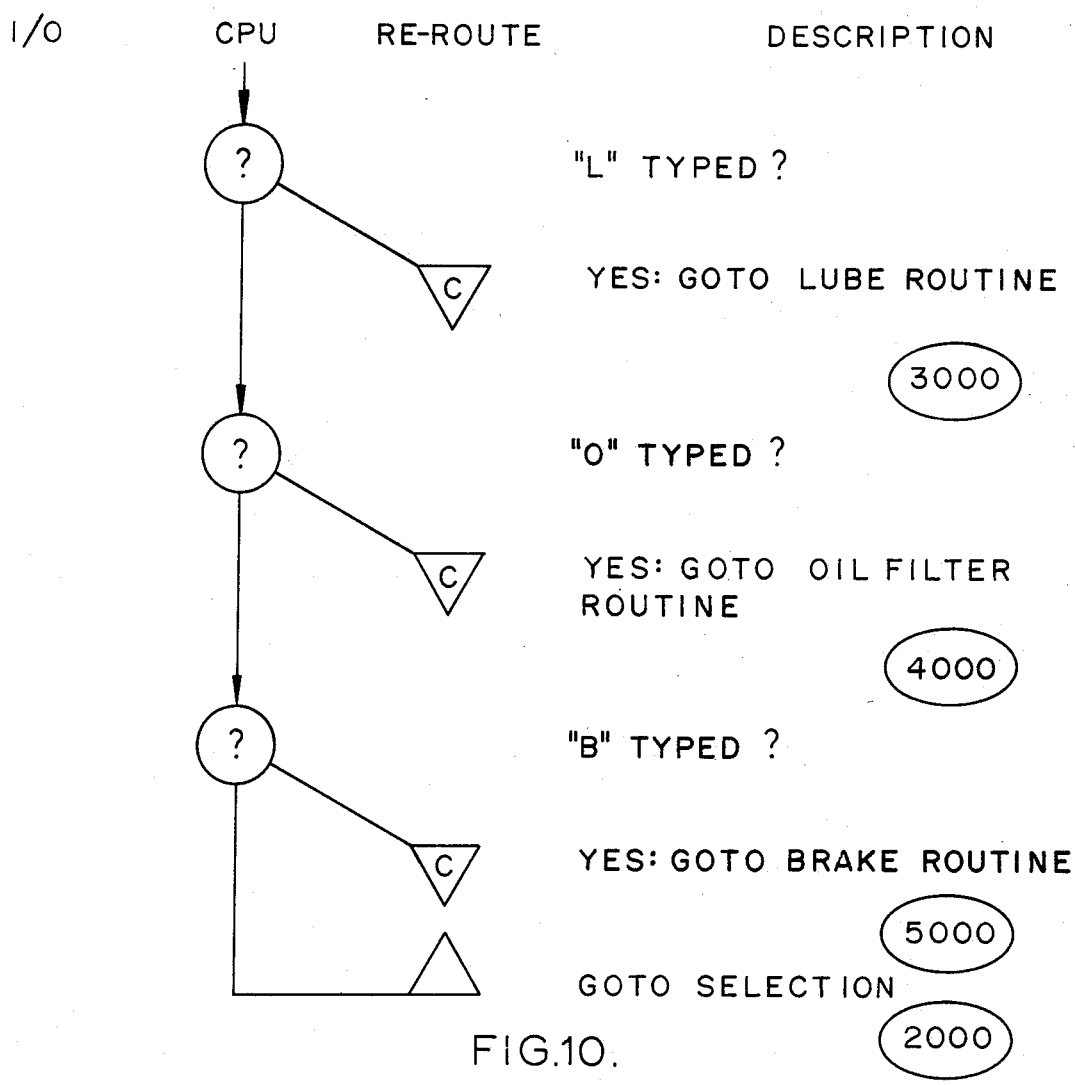

The three selections need three "REROUTE?" symbols in the flow chart, as shown in FIG. 10.

Maintenance routines work with information pertaining to each routine. The information is organized in groups corresponding to each maintenance function. Each group is known as a record. The complete collection of records is called a file. We have three maintenance records in the maintenance file.

The rest of the routines use the various maintenance records. Part Two of the outline changes the information in the records to reflect completed servicing. Part Three displays the record information on the screen.

Routines in Part Two request the necessary information from the program user. This information on services performed together with the rules from the owner's manual on the car establish the next date and/or mileage for a servicing. This information is stored in the relevant record, an updated record file on a "CAR MAINTENANCE FILE" cassette.

Figure 11:
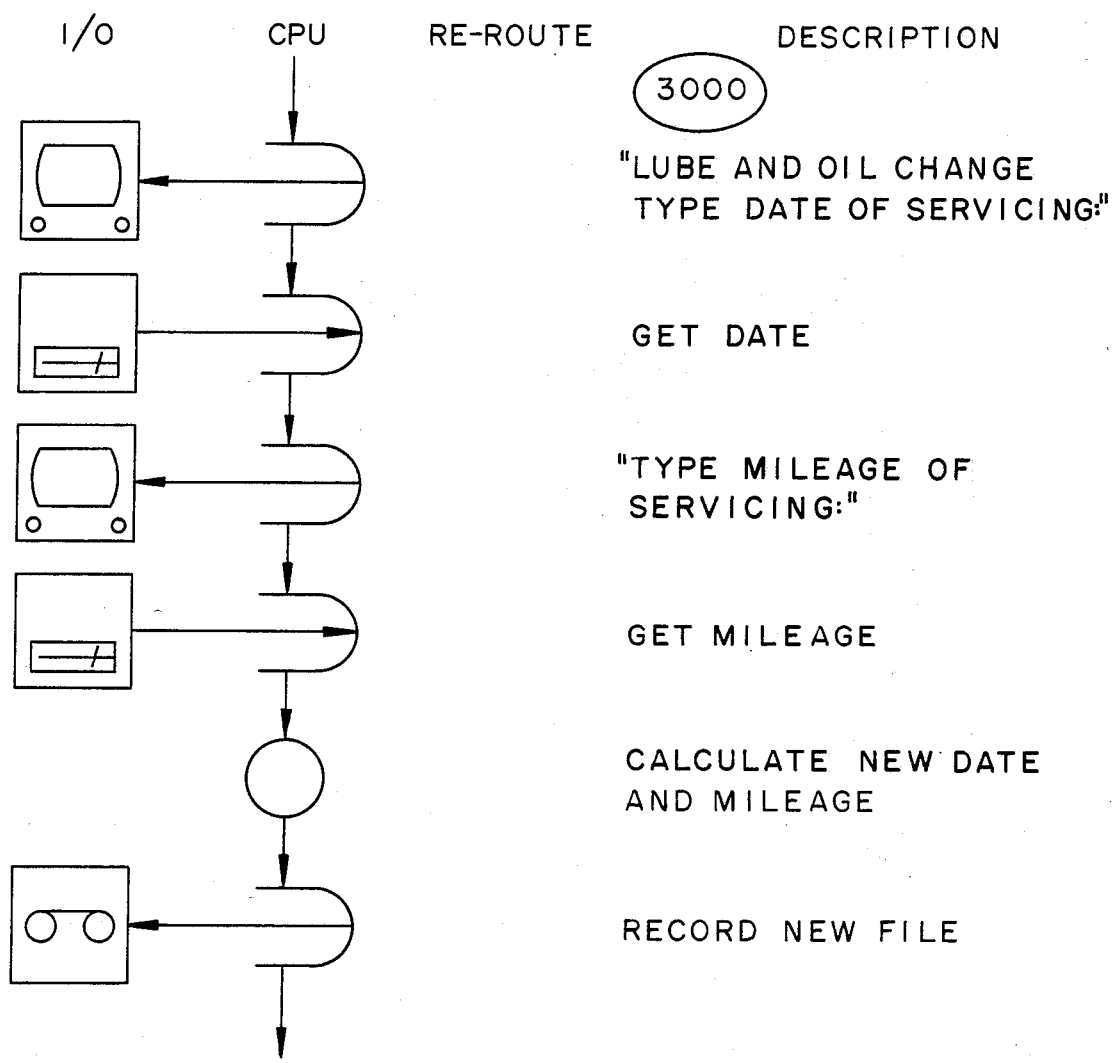

The first routine is "LUBE AND OIL." This must be done (in our example) every 3000 miles or three months, whichever comes first. It must request date and mileage from the program user. It will then calculate the date and mileage for the next such servicing and automatically put these into the "LUBE AND OIL" record, as shown in FIG. 11.

Figure 12:
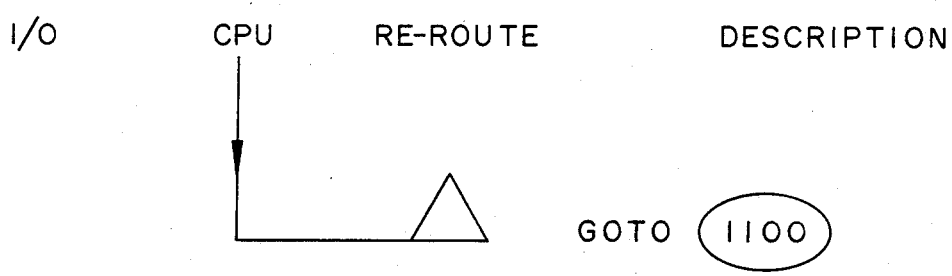

Finished with the "LUBE AND OIL" function, the program can either END or go back to Part One of the outline where you choose between the two functions. Going back to the start also makes it possible to run this or another part of the program without restarting. Since the information tape must be read again if the program is re-started from the beginning, the program is easier to use if it returns to the function choice and eliminates unnecessary operations, as shown in FIG. 12.

The "OIL FILTER" routine might best be included in the lube and oil routine, but the example assumes that it is separate just to outline the operations.

Figure 13:
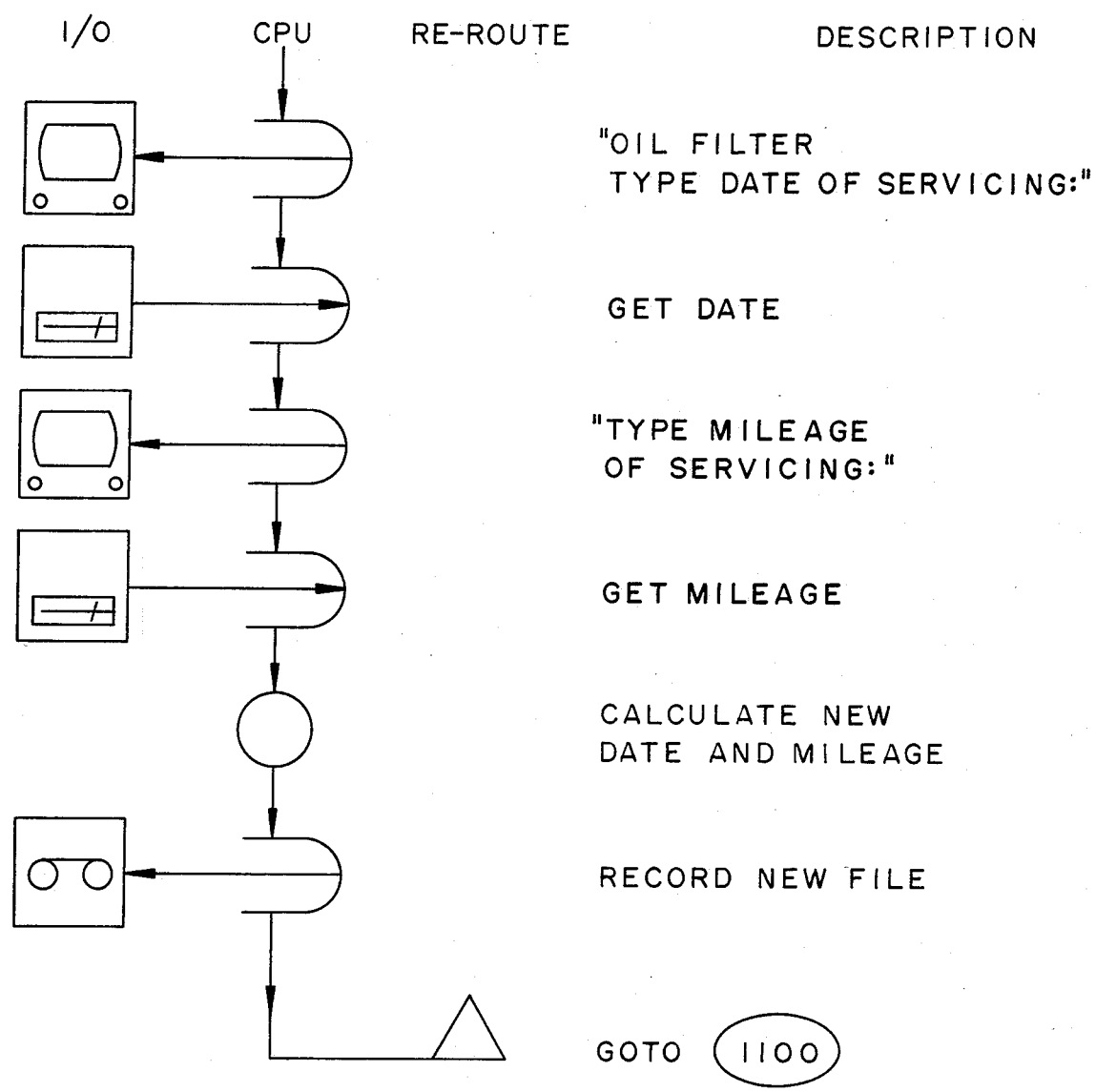

For this step the date and mileage is needed, as shown in FIG. 13.

Figure 14:
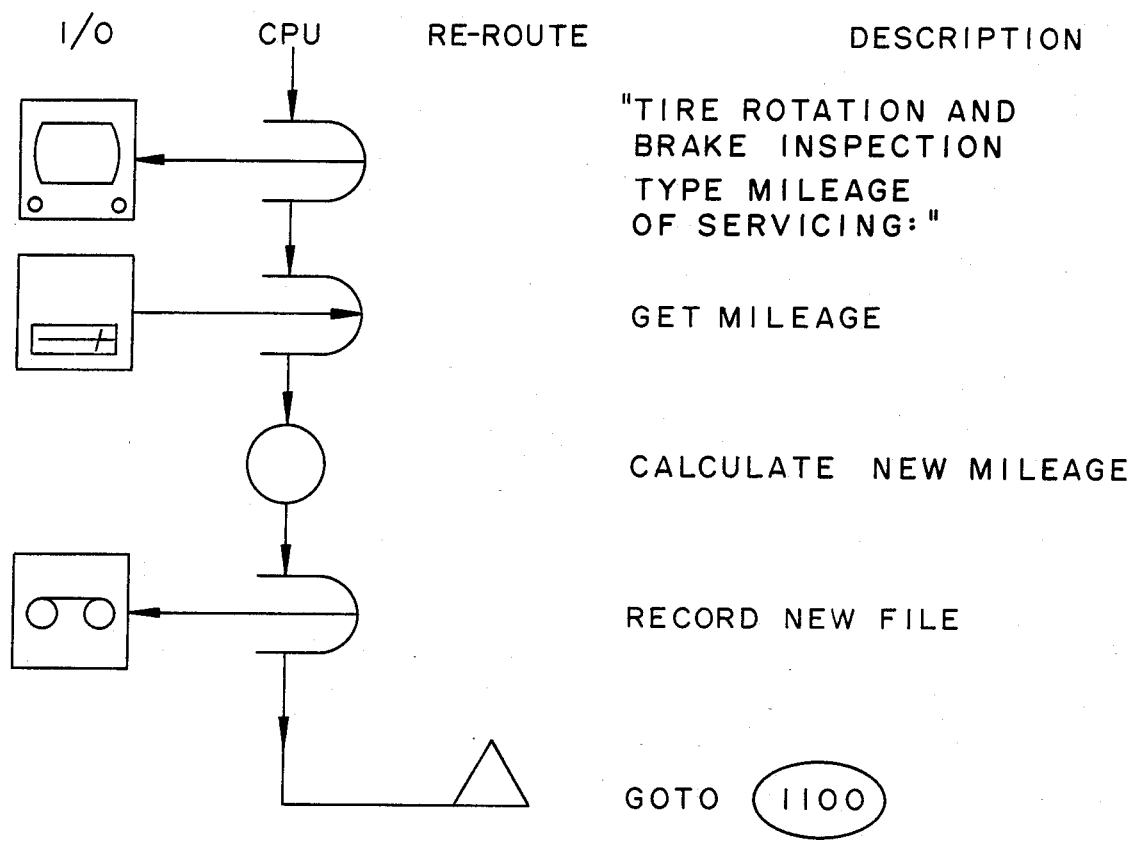

Tire rotation and brake inspection use mileage only, as shown in FIG. 14, which completes the flow chart.

As would be understood by one skilled in the art, the above program may be simplified and/or improved in a number of ways, as for example, by combining the oil filter and oil change portion of the program. It will suffice to say, however, that the above example represents the basic use of the graphic symbols of the present invention. It should also be apparent that using the above flow chart even an inexperienced operator could enter the represented program into a computer using the graphic keyboard shown in FIGS. 1 and 2.

Since from the foregoing the advantages of the device may be readily understood, further explanation is believed to be unnessary. However, since numerous modifications will readily occur to those skilled in the art after consideration of the foregoing specification and accompanying drawings, it is not intended that the invention be limited to the exact construction shown and described, but all suitable modifications and equivalents may be resorted to which fall within the scope of the appended claims. Having described the invention,

What I claim is:

1. A method for entering a source program written in a high level graphic programming language into a data processing system for use with an interface such as a compiler or interpreter to generate a machine level object program, said data processing system having a standard typewriter style keyboard and a multicolumn graphic keyboard, said method comprising the steps of, preparing a single path programming flow chart consisting of accessory symbols, CPU symbols and re-route symbols, said preparing step including the steps of choosing selected ones of said accessory symbols, CPU symbols and re-route symbols to define a data processing program and arranging said chosen symbols in a single sequence from a commencement point in said single path flow chart to a termination point in said single path flow chart, selecting from said multicolumn graphic keyboard, comprising a first column of accessory symbol keys, a second column of CPU symbol keys and a third column of re-route symbol keys, a first symbol key corresponding to a first symbol in said single path programming flow chart and activating said selected first symbol key, and selecting and activating, in sequence, subsequent to activation of said first symbol key, keys from said multicolumn keyboard corresponding to each symbol in said single path programming flow chart from said commencement point in said flow chart to said termination point in said flow chart, whereby a user of said data processing system may input a computer program represented by said single path programming flow chart directly into said data processing system by selectively activating accessory symbol keys, CPU symbol keys and re-route symbol keys corresponding to said accessary symbols, CPU symbols and re-route symbols chosen for said single-path programming flow chart.

2. The improved method of claim 1 wherein there is further included the step of establishing a fixed relationship between keys on said graphic keyboard and said programming symbols.

3. The improved method of claim 1 wherein said entering programming information step includes the step of selecting keys on said graphic keyboard from functional groups of keys, said functional groups of keys representing selected computer functions of internal processing, editing, branching, and accessory selection.

* * * * *